(12) United States Patent
Slater et al.

(10) Patent No.: US 8,875,148 B2
(45) Date of Patent: Oct. 28, 2014

(54) PRODUCT-SPECIFIC SYSTEM RESOURCE ALLOCATION WITHIN A SINGLE OPERATING SYSTEM INSTANCE

(75) Inventors: Paul Slater, Winchester (GB); Brian Stewart, Winchester (GB); Craig H. Stirling, Winchester (GB); Ian T. Stirling, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 13/159,892

(22) Filed: Jun. 14, 2011

(65) Prior Publication Data

US 2012/0324464 A1 Dec. 20, 2012

(51) Int. Cl.
*G06F 9/46* (2006.01)
*G06F 9/52* (2006.01)

(52) U.S. Cl.
CPC .................................... *G06F 9/52* (2013.01)
USPC .......................................... 718/104; 718/103

(58) Field of Classification Search
None
See application file for complete search history.

(56) References Cited

U.S. PATENT DOCUMENTS

| | | | |
|---|---|---|---|
| 6,134,664 A * | 10/2000 | Walker ............................ | 726/22 |
| 6,959,320 B2 | 10/2005 | Shah et al. | |
| 7,107,591 B1 * | 9/2006 | Karp et al. .................... | 718/104 |
| 7,933,964 B2 * | 4/2011 | McCollum et al. ........... | 709/207 |
| 8,266,616 B1 * | 9/2012 | Jacquot et al. ................ | 717/177 |
| 2004/0022212 A1 * | 2/2004 | Chowdhury et al. ......... | 370/329 |
| 2005/0160428 A1 * | 7/2005 | Ayachitula et al. ........... | 718/104 |
| 2007/0050484 A1 * | 3/2007 | Oertig et al. .................. | 709/220 |
| 2007/0198723 A1 * | 8/2007 | An et al. ........................ | 709/226 |
| 2007/0250630 A1 * | 10/2007 | Blanding et al. .............. | 709/226 |
| 2008/0092138 A1 | 4/2008 | Chung et al. | |
| 2008/0270752 A1 * | 10/2008 | Rhine .............................. | 712/30 |
| 2009/0100165 A1 * | 4/2009 | Wesley et al. ................. | 709/223 |
| 2009/0276771 A1 | 11/2009 | Nickolov et al. | |
| 2009/0291712 A1 * | 11/2009 | Park et al. ...................... | 455/558 |
| 2010/0082505 A1 * | 4/2010 | Hollingsworth et al. ....... | 706/11 |
| 2010/0250319 A1 * | 9/2010 | Khosla et al. ..................... | 705/8 |
| 2010/0318637 A1 | 12/2010 | Ly et al. | |
| 2011/0066973 A1 * | 3/2011 | Plom et al. ..................... | 715/808 |
| 2011/0078014 A1 * | 3/2011 | Feldman et al. ........... | 705/14.42 |
| 2011/0213669 A1 * | 9/2011 | Vojnovic et al. ........... | 705/14.71 |
| 2011/0270915 A1 * | 11/2011 | Morard ......................... | 709/203 |
| 2012/0096293 A1 * | 4/2012 | Floyd et al. ................... | 713/323 |
| 2013/0091278 A1 * | 4/2013 | Ludwig et al. ................ | 709/224 |

OTHER PUBLICATIONS

Scott Chate, Convert your web application to a multi-tenant SaaS solution, Web article: IBM Developer Works, Dec. 14, 2010, pp. 1-22, IBM Corporation, Published on the World Wide Web at: http://public.dhe.ibm.com/software/dw/cloud/library/cl-multitenantsaas-pdf.pdf.

(Continued)

*Primary Examiner* — Emerson Puente
*Assistant Examiner* — Mehran Kamran
(74) *Attorney, Agent, or Firm* — Lee Law, PLLC; Christopher B. Lee

(57) ABSTRACT

Resource constraints for a group of individual application products to be configured for shared resource usage of at least one shared resource within a single operating system instance are analyzed by a resource allocation module. An individual resource allocation for each of the group of individual application products is determined based upon the analyzed resource constraints for the group of individual application products. The determined individual resource allocation for each of the group of individual application products is implemented within the single operating system instance using local inter-product message communication bindings by the single operating system instance.

14 Claims, 6 Drawing Sheets

(56) References Cited

OTHER PUBLICATIONS

Archana Sulochana Ganapathi, Predicting and Optimizing System Utilization and Performance via Statistical Machine Learning, Technical Report: Electrical Engineering and Computer Sciences University of California at Berkeley, Dec. 17, 2009, pp. 1-111, No. UCB/EECS-2009-181, University of California at Berkeley, Published on the World Wide Web at: http://www.eecs.berkeley.edu/Pubs/TechRpts/2009/EECS-2009-181.pdf.

Author Unknown, Java Tuning White Paper, Java(TM) Enterprise Platforms and Developer Organization, Dec. 20, 2005, pp. 1-10, Sun Microsystems, Inc., Published on the World Wide Web at: http://java.sun.com/performance/reference/whitepapers/tuning.html.

Author Unknown, Performance and Scale in Cloud Computing, White Paper, Oct. 2010, pp. 1-16 (+ 1 page added for citation), Joyent, Inc., Published on the World Wide Web at: http://lpage.joyent.com/rs/joyent/images/Performance%20and%20Scale%20In%20Cloud%20Computing.pdf.

Faouzi Kamoun, Virtualizing the Datacenter Without Compromising Server Performance, Article: ACM Ubiquity, Aug. 17, 2009, pp. 1-12, vol. 2009, Issue 9, Association for Computing Machinery, Inc., Published on the World Wide Web at: http://delivery.acm.org/10.1145/1600000/1595424/v10i9__kamoun.pdf?key1=1595424&key2=4615548921&coll=DL&dl=ACM&ip=122.167.87.58&CFID=11102495&CFTOKEN=41332991.

David Margery, et al., Capabilities for per Process Tuning of Distributed Operating Systems, Report: INRIA, Dec. 2004, pp. 1-13 (+ two cover pages), No. 5411, Published on the World Wide Web at: http://hal.archives-ouvertes.fr/docs/00/07/05/95/PDF/RR-5411.pdf.

Author Unknown, Create a New Resource Allocation Policy, Article: Microsoft TechNet, Printed from Website on Jun. 14, 2011, pp. 1-4, Published on the World Wide Web at: http://technet.microsoft.com/en-us/library/cc771472.aspx.

United States Patent and Trademark Office, Office Action for U.S. Appl. No. 13/434,637, Oct. 16, 2013, pp. 1-40, Alexandria, VA, USA.

United States Patent and Trademark Office, Office Action for U.S. Appl. No. 13/434,637, Mar. 14, 2014, pp. 1-43, Alexandria, VA, USA.

United States Patent and Trademark Office, Notice of Allowance for U.S. Appl. No. 13/434,637, Jun. 20, 2014, pp. 1-15, Alexandria, VA, USA.

* cited by examiner

PRODUCT-SPECIFIC SYSTEM RESOURCE ALLOCATION WITHIN A SINGLE OPERATING SYSTEM INSTANCE

BACKGROUND

The present invention relates to resource allocation for multiple product instances. More particularly, the present invention relates to product-specific system resource allocation within a single operating system instance.

Tuning of system resources for different products conventionally involves partitioning a single system into multiple operating system instances. Products are installed in isolation within these operating system instances with their own allocation of system resources bounded by the operating system instance within which the respective product is installed. Multiple products communicate with one another across the different operating system instances via transmission control protocol/Internet protocol (TCP/IP).

BRIEF SUMMARY

A method includes analyzing, via a resource allocation module, resource constraints for a plurality of individual application products to be configured for shared resource usage of at least one shared resource within a single operating system instance; determining an individual resource allocation for each of the plurality of individual application products based upon the analyzed resource constraints for the plurality of individual application products; and implementing the determined individual resource allocation for each of the plurality of individual application products within the single operating system instance using local inter-product message communication bindings via the single operating system instance.

A system includes at least one shared resource operable within a single operating system instance and a processor programmed to analyze resource constraints for a plurality of individual application products to be configured for shared resource usage of the at least one shared resource within the single operating system instance; determine an individual resource allocation for each of the plurality of individual application products based upon the analyzed resource constraints for the plurality of individual application products; and implement the determined individual resource allocation for each of the plurality of individual application products within the single operating system instance using local inter-product message communication bindings via the single operating system instance.

A computer program product includes a computer readable storage medium including computer readable program code, where the computer readable program code when executed on a computer causes the computer to analyze, via a resource allocation module, resource constraints for a plurality of individual application products to be configured for shared resource usage of at least one shared resource within a single operating system instance; determine an individual resource allocation for each of the plurality of individual application products based upon the analyzed resource constraints for the plurality of individual application products; and implement the determined individual resource allocation for each of the plurality of individual application products within the single operating system instance using local inter-product message communication bindings via the single operating system instance.

DETAILED DESCRIPTION

Figure 1:
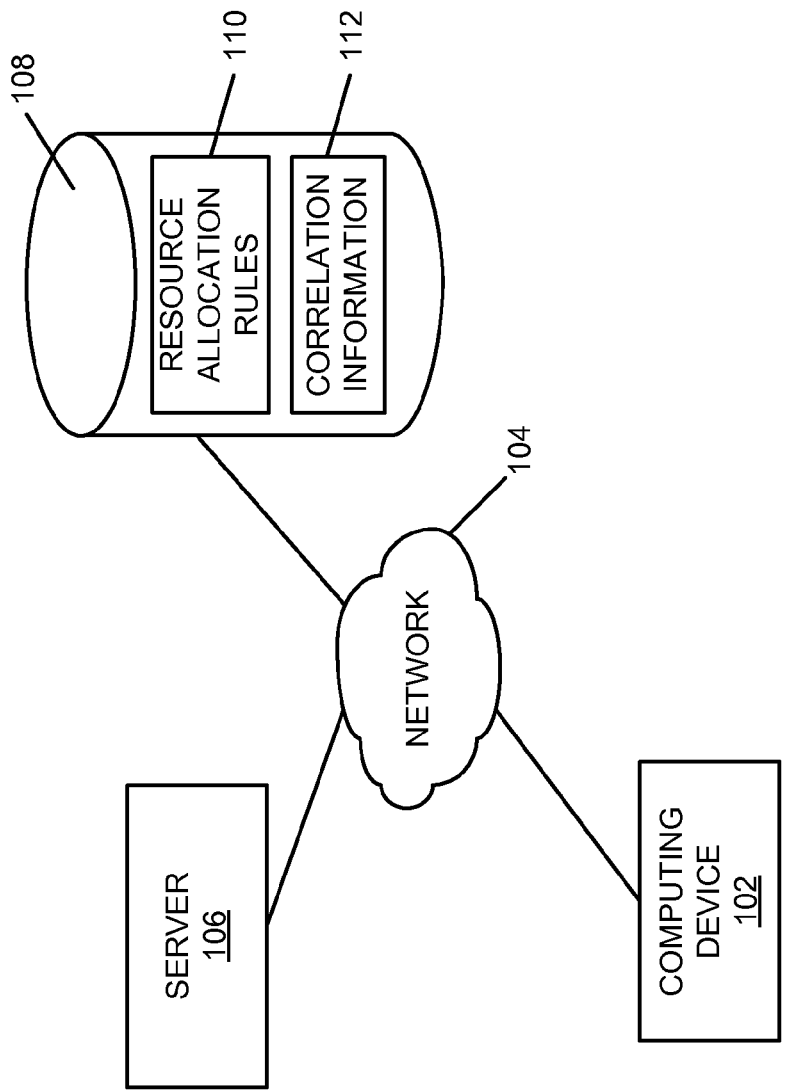
FIG. 1 is a block diagram of an example of an implementation of a system for automated product-specific resource allocation within a single operating system instance according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides product-specific system resource allocation within a single operating system instance for a multiple-product messaging environment. Multiple applications/products are configured to share system resource allocations via automated individual product-specific tuning such that individual resource allocations do not impact other installed products within the same operating system instance. The automated individual product-specific tuning further facilitates use of local communications via local bindings supported by the single operating system instance to improve messaging performance. Analysis of a current multi-product configuration is performed to select a resource allocation rule for configuration of shared resource distribution within the single operating system instance. A resource allocation rule feedback loop provides in-system feedback with respect to in-system efficiency (e.g., messaging efficiency) and any implemented system configuration changes that may differ from the provided resource allocation rules. The provided resource allocation rule(s) may be modified and/or new resource allocation rules may be created based upon this rule processing feedback to provide a continually improving individual system resource allocation protocol. A configuration processing loop manages initial configuration for new product installations and reallocation of shared system resources for updates to a system configuration.

As such, by use of the present subject matter, a single operating system instance may be partitioned for product-specific tuning and for optimal performance that increases over time and over configuration changes, and identified performance improvement may be distributed in an automated manner to other systems. Further, shared system resource allocation and inter-product communication latency may be improved in an automated manner, thereby improving system configuration and performance, respectively. For messaging systems of increasing size and complexity, the present subject matter may scale to accommodate such increases and message communication improvements may also scale to provide additional performance improvements. Further, processing for automated identification and implementation of resource allocation rules may become more efficient over time as system configurations are identified and process allocations rules are correlated with metrics and archived for reuse.

To facilitate shared system resource allocations, total available system resources within the single operating system environment are determined. Total available system resources may include an amount of memory (e.g., random access memory (RAM)), a configured maximum number of semaphores available for allocation, or any other system resource that may be shared among installed products. Either in association with a new pending product installation or any change in configuration, currently-installed and/or active products are identified within the single operating system platform via product and/or process identifiers (IDs) associated with the respective products/processes. A determination is made as to which installed products are active by analysis of the obtained process IDs.

Decision metrics are performed to determine resource utilization relative to the total available system resources. Decision metrics may include, for example, what products are installed on the system, what systems/products are active, relative priorities of applications, maximum resource usage values for each product/process, minimum resource usage values for each product/process, whether product process IDs may be split by specific user IDs, and whether any product shell scripts exist to allow pre-defined tuning. A process ID list including product-specific process IDs for all active application products/processes may be generated and used to identify a product-specific shared resource tuning configuration for the individual application products. The product-specific shared resource tuning configuration may be stored as a reusable resource allocation rule that may be applied to other similar application product configurations. Many other possible metrics exist and all are considered within the scope of the present subject matter.

The gathered metrics may be processed locally and/or sent to any such server or other source. Processing of the gathered metrics either locally or remotely may result in identification or receipt, respectively, of resource allocation rules based on the metric values. The resource allocation rules may be individually tailored to particular product combinations and system configurations.

The resource allocation rules may be obtained locally and/or from a server or other source (e.g., a database). The database or local storage may collect data from many systems, including priorities and other information, may correlate this information across the multiple systems. Resource allocation rules may be generated based upon the processed metrics and stored for future reuse. As such, a metric versus process allocation rule correlation archive may be established and stored to facilitate systematic automated retrieval of known rules for resource allocation of previously-encountered system metric scenarios.

The resource allocation rules may further include "co-existence" resource allocation rules that operate to identify configurations where two or more products/processes utilize the same resources in the same or a similar manner. Use of a resource in a same or similar manner may include use of an identical or similar quantity of a given resource (e.g., semaphores, memory, etc.), use of a resource for similar types of processing (e.g., use of a semaphore for accessing similar resources), or any other similar resource usage as appropriate for a given implementation.

As described above, a configuration processing loop manages initial configuration for new product installations and reconfiguration for updates to a system configuration (e.g., installation or removal of products, activation and deactivation of products, changes in priorities of applications, changes in minimum and/or maximum resource values for products, administrative inputs/changes, etc.). As such, in addition to performing metric evaluation in association with initial system resource distribution, the metric evaluation may be performed in response to changes in system configurations and in-system events to redistribute shared resource use within the single operating system instance. Each new product installation, removal, activation, and/or deactivation (e.g., product configuration change) within a system may generate an event that triggers re-evaluation of existing allocations, and re-allocation of system resources on an individual basis for each product. Evaluation of in-system efficiency (e.g., messaging latency, etc.) may be performed and the configuration processing loop may further cause redistribution based upon determined opportunities for further improvement of system efficiency. Any such determinations and/or changes to shared resource distribution relative to resource allocation rules used for initial or subsequent system resource distribution among products may be fed back via the rule processing feedback loop to further improve rule implementation for future deployments within similarly configured systems. As such, the processing described herein may be considered adaptive to system changes and may be iteratively performed to reassign resource distributions in response to any relevant in-system event and/or change.

A shared memory allocation may be configured, for example, via a configuration statement, such as the following pseudo configuration statement.

<userid>.<resource>_allocation

As can be seen from the above pseudo configuration statement, a "userid" identifier may be used to specify resource allocation on a per user basis. Further, a "resource" identifier may be used to specify a system resource for which an individual product and user allocation is configured. An "allocation" identifier may specify the allocation for this particular product and user combination. Many other possibilities exist for individual product and/or user resource allocation configuration statements and all are considered within the scope of the present subject matter.

To further this example, a default allocation value may be configured for a given resource, product, and/or user. For purposes of the present examples, a variable "X" will be used to represent the default allocation. A maximum allocation of a system resource within a system will be represented by a variable "Y." The value of "Y" may significantly exceed the value of "X" for certain implementations.

For example, for systems with large numbers of shared resources, a semaphore maximum allocation may exceed one million (1,000,000) semaphores. A default value for all installed products may default to a fixed number of the maximum allocation or the maximum allocation divided by a typical number of products or some other default allocation as appropriate for a given implementation.

However, using the present subject matter, a system resource tuning parameter for a product may be individually configured to deviate from a default value (e.g., X) and allocated as a percentage (e.g., 10%, 20%, etc.) or other formulation relative to a maximum value (e.g., Y) of a shared resource available for allocation to the product within the single operating system instance. The percentage/proportion individually allocated to each product may be configured based upon the product size, importance/priority, or other factors within the messaging environment, with the total allocation not exceeding the maximum value (e.g., Y).

To continue with the present example, the following pseudo default allocation represents a default allocation for a "shared memory maximum" configuration value, identified by the variable name "shmmax" within the present example.

shmmax (default shared memory maximum allocation)=(X)

The value of "X" may be considered the default for all products within the system. This default allocation may be individually tuned for each product to deviate from the configured default. For example, assuming three products, "Product1," "Product2," and "Product3," the following individual process allocations may be made based upon processing of the metrics for a given system. It is assumed that "Product1" is the highest priority product and that "Product2" is the lowest priority product.

product1_shmmax=(0.6Y)
product2_shmmax=(0.1Y)
product3_shmmax=(0.3Y)

As such, "Product1" is allocated sixty percent (60%) of the maximum value (e.g., Y) for shared memory allocation within the single operating system. Similarly, the "Product2" is allocated ten percent (10%) of the maximum value (e.g., Y) and the "Product3" is allocated thirty percent (30%) of the maximum value (e.g., Y).

Other possibilities exist for individual product resource tuning within a single operating system. For example, a default priority may be assigned to products and deviations from the default priority may be assigned to certain products. In such an implementation, products configured with a deviation from the default priority may have their allocations made first if they deviate with a higher priority than the default priority (or last if they deviate with a lower priority than the default priority), while a number of products configured with the default priority may be assigned the default maximum allocation (e.g., X) if that default maximum is available, or may have the remaining allocable resources divided equally among equal-priority products. In any such implementation, default minimum allocations may be observed to ensure that all products may operate with the individually-tuned allocations. Many other possibilities exist for individual product resource tuning within a single operating system and all are considered within the scope of the present subject matter.

Regarding the co-existence rules described above, co-existence rules may be considered shared allocations. The following pseudo co-existence rule example syntax illustrates possible partitioning of resources via a co-existence rule. For purposes of the present example, it is assumed that one million (1,000,000) semaphores are available within a single operating system instance. It is further assumed that two products use a similarly large number of semaphores (e.g., productA uses 450,000 and productB uses 350,000 semaphores), and that a third product is determined to use a smaller number of semaphores (e.g., productC uses 200,000 semaphores).

productA.productB.semaphore=800000
productC.semaphore=200000

As can be seen from the above pseudo co-existence rule example syntax, the two products (e.g., productA and productB) that share similar processing decisions with respect to semaphore use are provided with a shared co-existent allocation of semaphores, while the third product (e.g., productC) that utilizes a different number is provided with a separate non-shared allocation to ensure that its semaphore use does not interfere with that of the two products (e.g., productA and productB) operating under the shared co-existent allocation. Many other possibilities exist for identification of similar processing constraints and sharing of resource allocations and all are considered within the scope of the present subject matter.

It should be noted that conception of the present subject matter resulted from recognition of certain limitations associated with conventional existing product tuning. For example, partitioned operating systems are used to allow individual product tuning without impacting resource utilization of other installed products. The use of multiple partitioned operating systems to implement product tuning requires use of TCP/IP for communications between different products. The present subject matter improves on existing conventional systems in that multiple products may be installed and resource utilization may be individually tuned within a single operating system instance without individual product resource utilization impacting resource utilization of other installed products. As a result, communication efficiency and latency may be improved by providing for local communications between installed products within the single operating system instance instead of requiring use of TCP/IP for inter-product communications, as with conventional multiple-operating system instance systems. Further, individual product tuning within the single operating system instance is improved by reducing administrative requirements associated with conventional partitioning of multiple operating system instances. As such, improved multi-product system resource allocations and communication may be obtained by use of the product-specific system resource allocation within a single operating system instance described herein.

The product-specific system resource allocation within a single operating system instance described herein may be performed in real time to allow prompt installation and individual product allocation of system resources and local inter-product communications. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described herein (e.g., within a portion of a second or within a few seconds). These terms, while difficult to precisely define, are well understood by those skilled in the art.

FIG. 1 is a block diagram of an example of an implementation of a system 100 for automated product-specific resource allocation within a single operating system instance. A computing device 102 communicates via a network 104 with a server 106. A rule database 108 provides a resource allocation rules storage area 110 that stores resource allocation rules and a correlation information storage area 112 that stores correlation information that correlates resource allocation rules with different product combinations and operating system implementations.

As will be described in more detail below in association with FIG. 2 through FIG. 5B, either the computing device 102 or the server 106 may utilize the resource allocation rules and correlation information to provide dynamic automated product-specific resource allocation within a single operating system instance for active products that are executed on the computing device 102. Active products may change in response to installation, un-installation, activation, and deactivation of available application products. As such, the processing described herein adapts to changes in active products via a continuous analytical loop that evaluates resource availability versus resource utilization for the resulting change to the active products. Additionally, a resource allocation rule feedback mechanism provides dynamic distribution of configuration options and/or profiles and responsive measures of efficiency of implementations and any changes that are made for particular implementations. The resource allocation rule feedback mechanism improves initial rule distribution over time as rules are tuned to product-specific combinations and executable environment specifics, such as operating platform and operating system specifics.

The automated product-specific resource allocation within a single operating system instance is based upon analysis of available resources within an operating system instance executed by the computing device 102 and analysis of system resource requirements of the respective active products. As described in more detail below, decision metrics may be applied to the in-system analysis results and resource allocation rules may be selected based upon this analysis as part of the decision metric processing to configure independent product-specific resource allocations for different active products within the single operating system instance.

It should be noted that the computing device 102 may be a portable computing device, either by a user's ability to move the computing device 102 to different locations, or by the computing device 102's association with a portable platform, such as a plane, train, automobile, or other moving vehicle. It should also be noted that the computing device 102 may be any computing device capable of processing information as described above and in more detail below. For example, the computing device 102 may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

It should additionally be noted that while the present subject matter is directed toward product-specific resource allocation within a single operating system instance, the computing device 102 may execute multiple operating system instances concurrently without departure from the scope of the present subject matter. In such an implementation, the product-specific resource allocation within a single operating system instance described herein may be applied simultaneously to each such operating system instance to individually manage resource allocations within each such operating system instance and to provide local bindings as a messaging platform between active products within each such operating system instance. Accordingly, the present subject matter may be applied to a variety of different operating platforms, as appropriate for a given implementation.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server 106 may include one or more devices capable of providing data for consumption by a device, such as the computing device 102, via a network, such as the network 104. As such, the server 106 may include a web server or other data server device and may provide on-demand configuration and services, as appropriate for a given implementation.

The rule database 108 may include one or more databases or other storage devices that may also be dynamically activated on demand or statically operative, as appropriate for a given implementation. The resource allocation rules storage area 110 and the correlation information storage area 112 may be stored in the form of tables or other arrangements accessible by the computing device 102 and the server 106.

Figure 2:
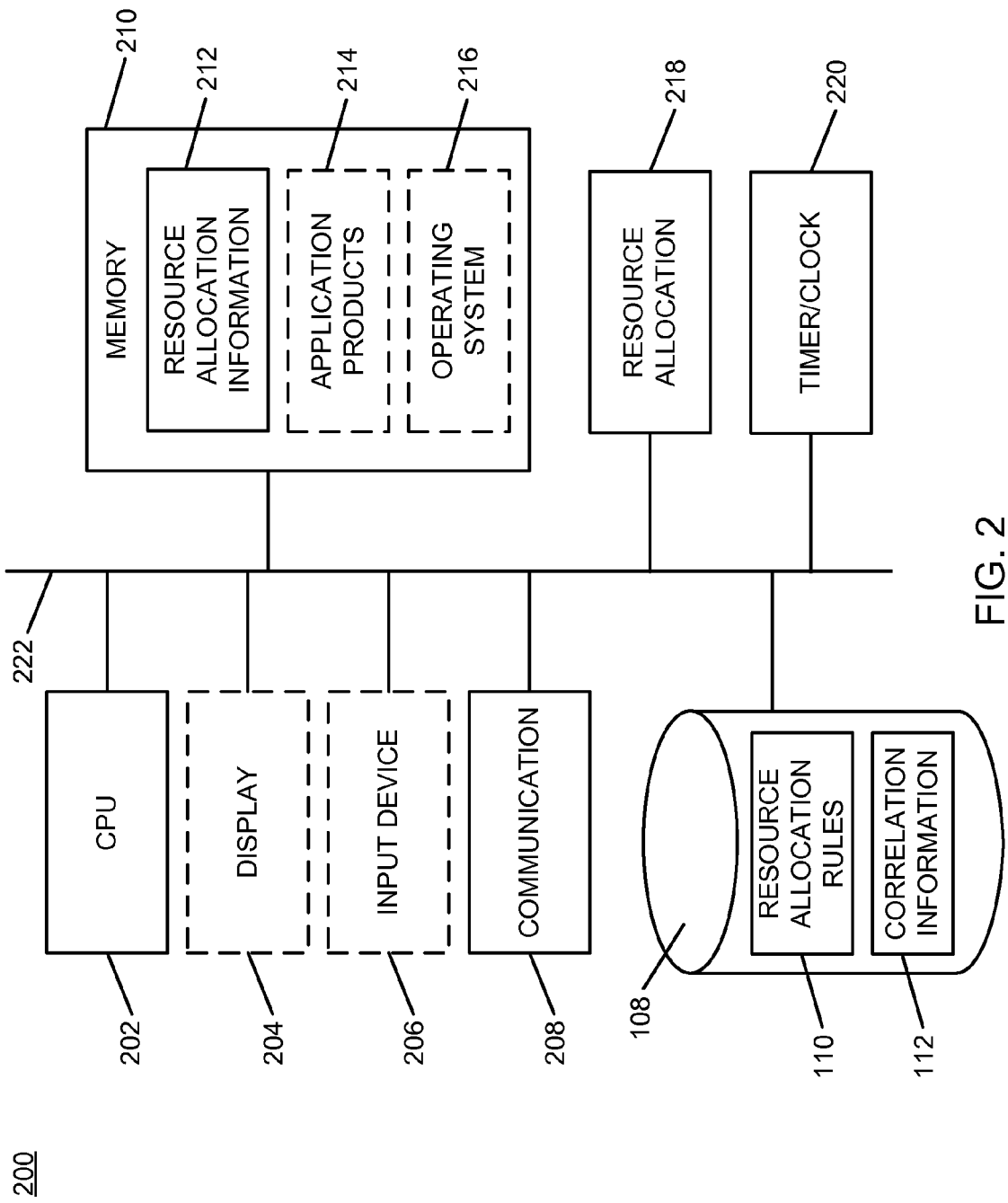
FIG. 2 is a block diagram of an example of an implementation of a core processing module capable of performing automated product-specific resource allocation within a single operating system instance according to an embodiment of the present subject matter.

FIG. 2 is a block diagram of an example of an implementation of a core processing module 200 capable of performing automated product-specific resource allocation within a single operating system instance. The core processing module 200 may be associated with either the computing device 102 or the server 106, as appropriate for a given implementation. Further, the core processing module 200 may provide different and complementary processing of product-specific resource allocations within a single operating system in association with each implementation, as described in more detail below. A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or output. However, the core processing module 200 may also provide user output and configurability via the display 204 and the input device 206, respectively.

A communication module 208 provides interconnection capabilities that allow the core processing module 200 to communicate with other modules within the system 100, such as the rule database 108, to access resource allocation rules and correlation information, and to provide rule feedback and new resource allocation rules. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a resource allocation information storage area 212 that stores information associated with active products, such as process ID lists, resource implementation efficiency measures, resource allocation changes (e.g., manual or automated), resource allocation rule changes, and other information associated with active products processed by the core processing module 200. As will be described in more detail below, the resource allocation information stored within the resource allocation information storage area 212 is used to identify active application product configurations, select resource allocation rules, measure implementation efficiency (e.g., messaging efficiency) relative to target efficiency, and other information processing as described above and in more detail below.

An application products area 214 and an operating system area 216 within the memory 210 represent both storage and executable space for application products and operating system(s), respectively. The application products area 214 and the operating system area 216 are illustrated with a dashed-line representation within FIG. 2 to indicate that they may or may not be associated with a server-based implementation of the core processing module 200. As such, the application products area 214 and the operating system area 216 may be applicable to implementations of the core processing module 200 associated with computing devices, such as the computing device 102, with which the automated product-specific resource allocation within a single operating system instance described herein may be implemented.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A resource allocation module 218 is also illustrated. The resource allocation module 218 provides, among other things, active application product identification, process ID list generation, resource allocation rule selection and implementation, implementation efficiency analysis, configuration modification, and resource allocation rule modification and correlation for the core processing module 200, as described above and in more detail below. As such, the resource allocation module 218 may operate as a process/active product analyzer, a decision engine, and a feedback engine as appropriate for a given implementation. The resource allocation module 218 implements the automated product-specific resource allocation within a single operating system instance of the core processing module 200.

Though the resource allocation module 218 is illustrated as a component-level module for ease of illustration and description purposes, it should be noted that the resource allocation module 218 may include any hardware, programmed processor(s), and memory used to carry out the functions of this module as described above and in more detail below. For example, the resource allocation module 218 may include additional controller circuitry in the form of application specific integrated circuits (ASICs), processors, and/or discrete integrated circuits and components for performing communication and electrical control activities associated with the respective devices. Additionally, the resource allocation module 218 may include interrupt-level, stack-level, and application-level modules as appropriate. Furthermore, the resource allocation module 218 may include any memory components used for storage, execution, and data processing for performing processing activities associated with the module.

It should also be noted that the resource allocation module 218 may form a portion of other circuitry described without departure from the scope of the present subject matter. Further, the resource allocation module 218 may alternatively be implemented as an application stored within the memory 210. In such an implementation, the resource allocation module 218 may include instructions executed by the CPU 202 for performing the functionality described herein. The CPU 202 may execute these instructions to provide the processing capabilities described above and in more detail below for the core processing module 200. The resource allocation module 218 may form a portion of an interrupt service routine (ISR), a portion of an operating system, a portion of a browser application, or a portion of a separate application without departure from the scope of the present subject matter.

A timer/clock module 220 is illustrated and used to determine timing and date information, such as timeouts or other processing, as described above and in more detail below. As such, the resource allocation module 218 may utilize information derived from the timer/clock module 220 for information processing activities, such as the automated product-specific resource allocation within a single operating system instance described herein.

The rule database 108 is also shown associated with the core processing module 200. As such, the rule database 108 may be operatively coupled to the core processing module 200 as appropriate for a given implementation.

The CPU 202, the display 204, the input device 206, the communication module 208, the memory 210, the resource allocation module 218, the timer/clock module 220, and the database 108 are interconnected via an interconnection 222. The interconnection 222 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the resource allocation rules storage area 110 and the correlation information storage area 112 are shown within the rule database 108, they may also be stored within the memory 210 without departure from the scope of the present subject matter. Accordingly, the core processing module 200 may take many forms and may be associated with many platforms.

Figure 3:
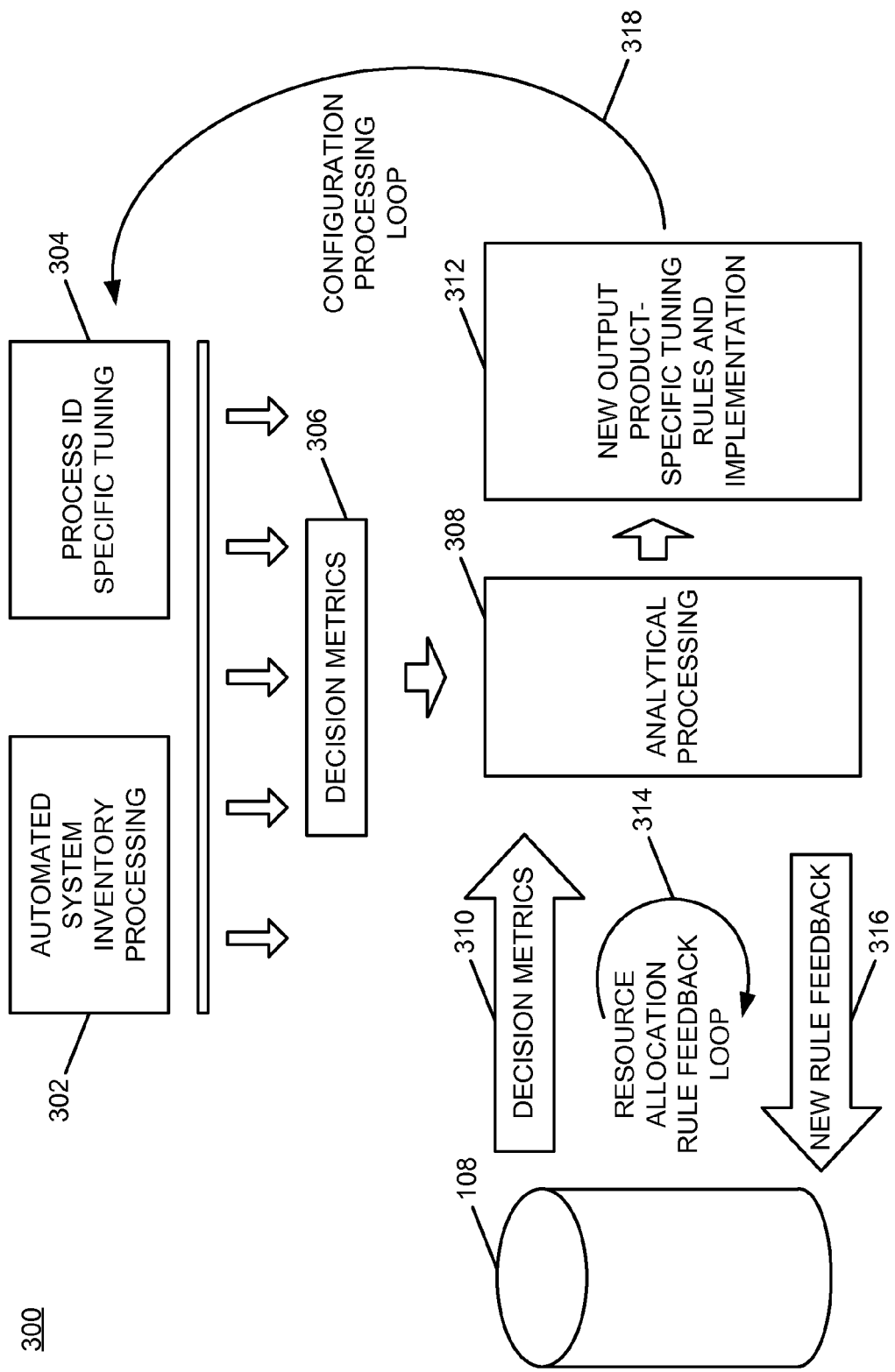
FIG. 3 is a process flow diagram of an example of an implementation of a process flow that may be used for automated product-specific resource allocation within a single operating system instance according to an embodiment of the present subject matter.

FIG. 3 is a process flow diagram of an example of an implementation of a process flow 300 that may be used for automated product-specific resource allocation within a single operating system instance. As initial inputs to the process flow 300, automated system inventory processing is performed at block 302 to determine what application products are installed on the system. At block 304, process identifier (ID) specific tuning is performed to identify active products and/or products to be installed and activated by use of product IDs.

At block 306, decision metrics are provided to analytical processing block 308 to process the inputs from blocks 302 and 304. It should be noted that the analytical processing block 308 may be implemented, for example, via the resource allocation module 218 described above in association with the core processing module 200.

As also described above, the decision metrics provided by block 306 may include, for example, what products are installed on the system, what systems/products are active, relative priorities of applications, maximum resource usage values for each product/process, minimum resource usage values for each product/process, whether product process IDs may be split by specific user IDs, and whether any product shell scripts exist to allow pre-defined tuning. A process ID list including all products/processes, product-specific process IDs may be generated and used to identify a product-specific shared resource tuning configuration for the individual application products. Many other possible decision metrics exist and all are considered within the scope of the present subject matter.

In association with analysis of the decision metrics provided by block 306, the analytical processing block 308 retrieves decision metrics in the form of one or more resource allocation rules from the rule database 108 as inputs 310. As described above, resource allocation rules may be generated, collected, and correlated with application product and operating system implementations based upon data obtained from many systems. Resource allocation rules may be provided with predictable/expected implementation efficiency (e.g., messaging efficiency) for identifiable application product configurations and operating system instance platforms (e.g., resource availabilities, etc.), relative priorities of application products, and other information gathered from the multiple systems. The analytical processing block 308 processes the received resource allocation rule(s) and makes a final determination of individual product-specific resource allocations for active products that is output at block 312. The output at block 312 represents new output product-specific tuning rules and implementation. It should be noted that adjustments or modifications to the received resource allocation rules may be made by the analytical processing block 308, such that the new output product-specific tuning rules and implementation may represent an additional variation relative to processing implemented within other systems.

As described above and in more detail below, efficiency analysis may be performed within the analytical processing block 308 and improved efficiency may be identified in response to configuration changes. Any modified resource allocation rules that are determined to improve implementation efficiency may be fed back via a resource allocation rule feedback loop 314 as new rule feedback 316 to the database 108 and/or server 106 (not shown), or other device(s) as appropriate for a given implementation. As such, the resource allocation rule feedback loop 314 provides a dynamic processing loop for increasing archived configuration options, granularity of resource allocation rule archival and implementation, and granularity of resource allocation rule distribution, among other possible improvements, each of which may be continually improved over time.

A configuration processing loop 318 is also illustrated. The configuration processing loop 318 operates responsive to configuration changes to cause the process flow 300 to iterate. Configuration changes may include installation or un-installation of one or more application products. Configuration changes may also include activation and/or deactivation of application products. Many other configuration changes are possible and all such configuration changes may trigger iteration of the process flow 300.

As such, the process flow 300 provides processing of decision metrics based upon installed and active products and decision metrics received as resource allocation rules. The process flow 300 implements an automated product-specific resource allocation within a single operating system instance and provides feedback via the resource allocation rule feedback loop 314 in the form of configuration variations relative to received resource allocation rules, and new resource allocation rules based upon observed efficiency improvements relative to the received resource allocation rules. The configuration processing loop 318 further provides responsiveness to configuration changes to iteratively process and improve system performance over time in an automated manner. Many other variations on the process flow 300 are possible and all are considered within the scope of the present subject matter.

Figure 4:
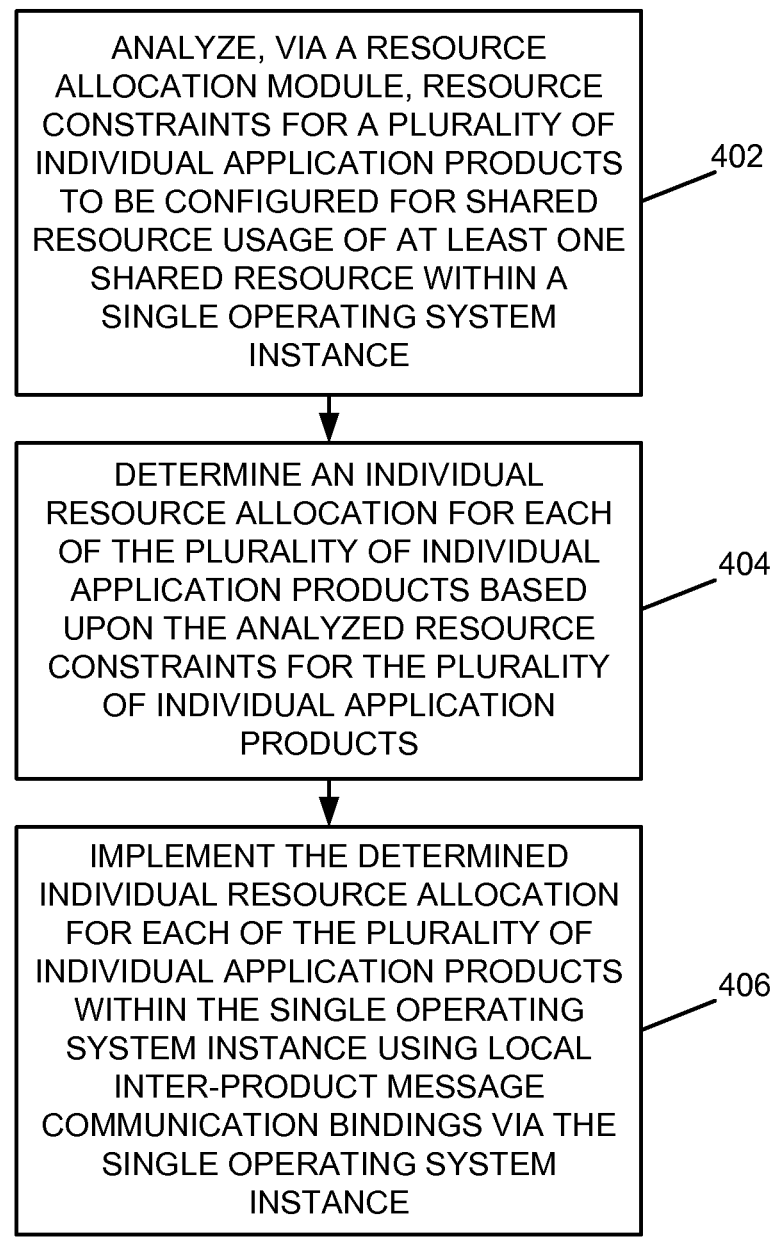
FIG. 4 is a flow chart of an example of an implementation of a process for automated product-specific resource allocation within a single operating system instance according to an embodiment of the present subject matter.
Figure 5A:
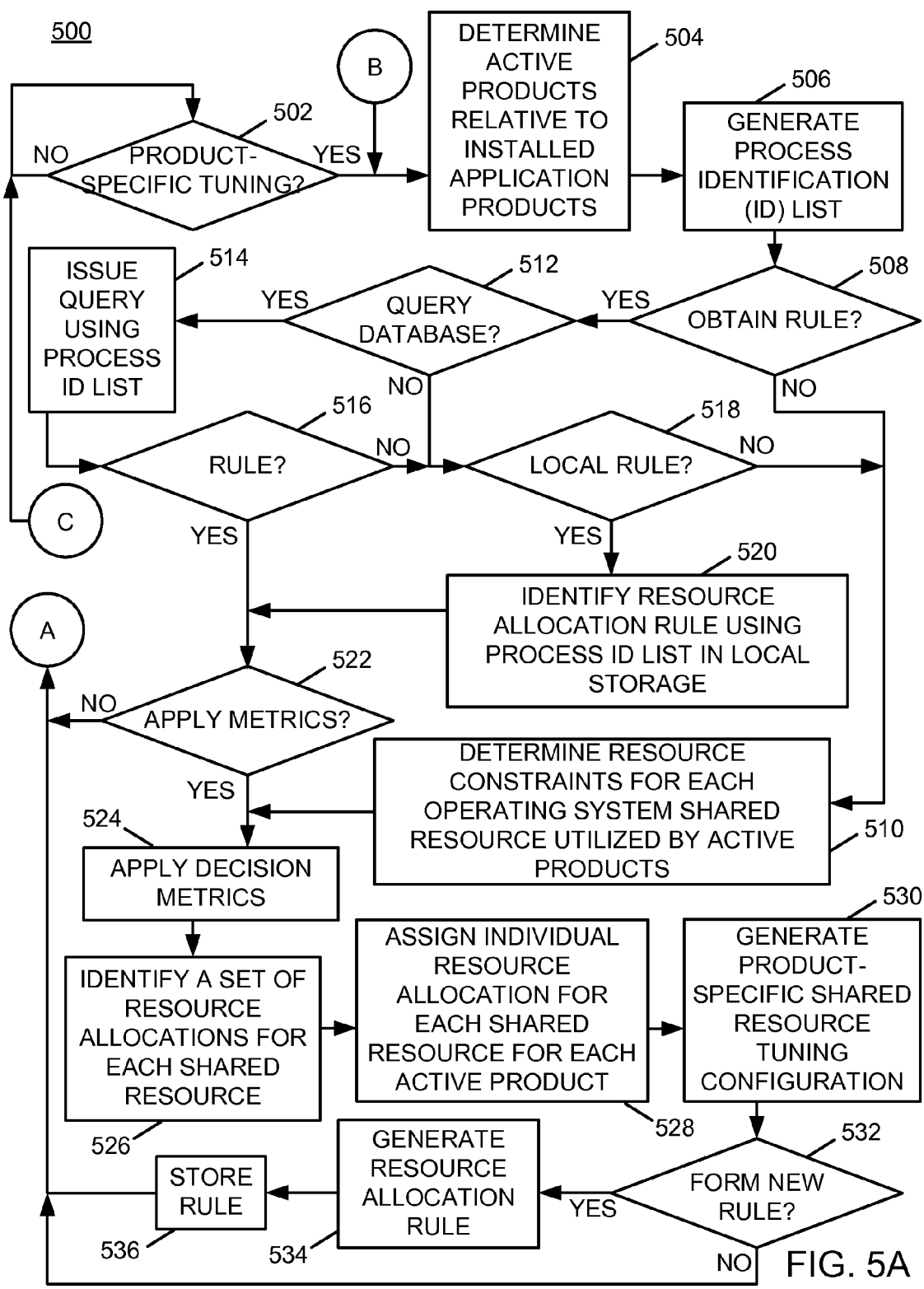
FIG. 5A is a flow chart of an example of an implementation of initial processing of a process for automated product-specific resource allocation within a single operating system instance according to an embodiment of the present subject matter.
Figure 5B:
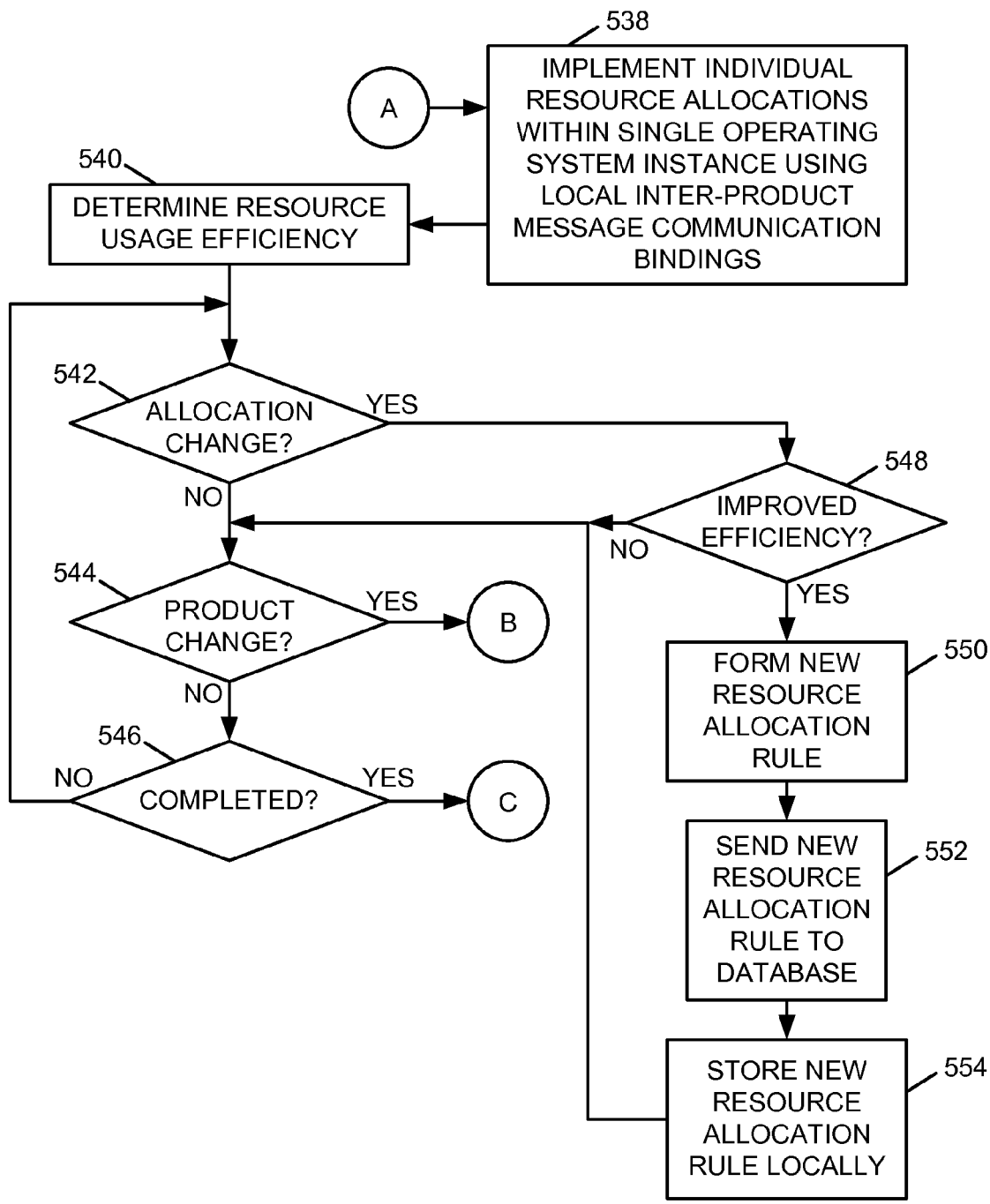
FIG. 5B is a flow chart of an example of an implementation of additional processing of a process for automated product-specific resource allocation within a single operating system instance according to an embodiment of the present subject matter.

FIG. 4 through FIG. 5B below describe example processes that may be executed by devices, such as the core processing module 200, to perform the automated product-specific resource allocation within a single operating system instance associated with the present subject matter. Many other variations on the example processes are possible and all are considered within the scope of the present subject matter. The example processes may be performed by modules, such as the resource allocation module 218 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter.

FIG. 4 is a flow chart of an example of an implementation of a process 400 for automated product-specific resource allocation within a single operating system instance. At block 402, the process 400 analyzes, via a resource allocation module, resource constraints for a plurality of individual application products to be configured for shared resource usage of at least one shared resource within a single operating system instance. At block 404, the process 400 determines an individual resource allocation for each of the plurality of individual application products based upon the analyzed resource constraints for the plurality of individual application products. At block 406, the process 400 implements the determined individual resource allocation for each of the plurality of individual application products within the single operating system instance using local inter-product message communication bindings via the single operating system instance.

FIGS. 5A-5B illustrate a flow chart of an example of an implementation of process 500 for automated product-specific resource allocation within a single operating system instance. It should be noted that processing associated with the process 500 may be performed at either a client device, such as the computing device 102, or at a server device, such as the server 106. Certain aspects of differences in processing are described below with the understanding that other variations in processing may be performed as appropriate for a given implementation. FIG. 5A illustrates initial processing within the process 500.

At decision point 502, the process 500 makes a determination as to whether to perform individual product-specific tuning for application products within a single operating system instance. Product-specific tuning may be performed, for example, by the analytical processing block 308 described above in association with the process flow 300 of FIG. 3 under control of the resource allocation module 218. As described above, product-specific tuning may be initiated by an event such as an installation of an application product, an un-installation of an application product, an activation of an application product, a de-activation of an application product, or other event as appropriate for a given implementation. Additionally, initiation of product-specific tuning may be invoked via the configuration processing loop 318 of the process flow 300 described above in response to changes for resource allocation and configurations within a single operating system.

In response to determining to initiate individual product-specific tuning for application products within a single operating system instance, the process 500 determines active application products relative to installed application products within the single operating system instance at block 504. The process 500 may also determine at least one minimum resource constraint and one maximum resource constraint for each operating system resource utilized by at least one of the active application products, as appropriate for the given implementation.

At block 506, the process 500 generates a process identification (ID) list for the active application products. It should be noted that the generated process ID list may also include determined individual resource allocations that may be added to the process ID list.

At decision point 508, the process 500 makes a determination as to whether to obtain a pre-configured resource allocation rule based upon the active application products represented in the process ID list or to perform local processing including possible generation of a resource allocation rule for storage and reuse. In response to determining to perform local processing including possible generation of a resource allocation rule for storage and reuse (i.e., determining not to obtain a pre-configured resource allocation rule) at decision point 508, the process 500 determines for each active product in the process ID list minimum and maximum resource constraints for each operating system shared resource utilized by the active products at block 510. A description of additional processing will be deferred and described below following a description of processing for an affirmative determination to obtain a pre-configured resource allocation rule at decision point 508.

In response to determining to obtain a pre-configured resource allocation rule at decision point 508, the process 500 makes a determination at decision point 512 as to whether to query a database, such as the rule database 108, using the process ID list as a resource allocation reuse identifier to request a pre-configured resource allocation rule. In response to determining to query a database for a resource allocation rule at decision point 512, the process 500 issues a query using the process ID list as the resource allocation reuse identifier at block 514.

At decision point 516, the process 500 makes a determination as to whether a pre-configured resource allocation rule has been received/obtained from the database. It should be noted that, as described above, timeouts and other processing associated with communication latency and other processing are omitted from the process 500 for brevity. As such, for purposes of the present example, it is assumed that if a pre-configured resource allocation rule is available based upon the process ID list provided in the query to the database as the resource allocation reuse identifier, the available resource allocation rule will be returned in response to the query.

In response to determining at decision point 516 that a resource allocation rule was not available via the database query, or in response to determining at decision point 512 not to query a database for a pre-configured resource allocation rule, the process 500 makes a determination at decision point 518 as to whether to search local storage for a pre-configured resource allocation rule, or whether to perform decision metrics without use of a pre-configured resource allocation rule, begin processing to determine resource utilization, and create a resource allocation rule for implementation and reuse. In response to determining at decision point 518 not to search local storage for a pre-configured resource allocation rule, the process 500 returns to block 510 to determine, for each active product in the process ID list, minimum and maximum resource constraints for each operating system shared resource utilized by the active products, and iterates as described above and in more detail below. In response to determining at decision point 518 to search local storage for a pre-configured resource allocation rule, the process 500 identifies a pre-configured resource allocation rule using the process ID list within local storage at block 520.

For purposes of the present example, it is assumed that a local pre-configured resource allocation rule is available. However, additional processing may be added to the process 500 to make a determination as to whether such a pre-configured resource allocation rule is available within local storage and this additional processing has been omitted to avoid overcrowding within FIG. 5A. The resource allocation rule, whether obtained from local storage or from a database, may include individual product-specific resource allocations for use within a single operating system instance based upon the process ID list.

In response to identifying a resource allocation rule using the process ID list as the resource allocation reuse identifier within local storage at block 520 or in response to determining at decision point 516 that a pre-configured resource allocation rule was available via the database query and has been received, the process 500 makes a determination as to whether to apply additional decision metrics to the obtained pre-configured resource allocation rule at decision point 522.

In response to determining to apply additional decision metrics to the obtained pre-configured resource allocation rule at decision point 522, or in response to determining for each active product in the process ID list minimum and maximum resource constraints for each operating system shared resource utilized by the active products at block 510, the process 500 applies at least one decision metric to the obtained pre-configured resource allocation rule or the determined resource constraints for the active application products at block 524. As described above, the decision metrics may include what application products are installed within the single operating system instance, what application products are active within the single operating system instance, relative priorities of the plurality of application products, maximum resource usage values for each of the plurality of application products, minimum resource usage values for each of the plurality of application products, whether product process identifiers (IDs) may be split by specific user IDs, and whether any product shell scripts exist to allow pre-defined tuning, or other decision metrics as appropriate for a given implementation. As such, modification to an obtained pre-configured resource allocation rule may be performed based upon the applied decision metrics.

At block 526, the process 500 identifies a set of individual resource allocations for each shared resource utilized by the active application products that utilize each shared resource within resource limitations for the shared resource within the single operating system instance. At block 528, the process 500 assigns the individual resource allocation for each shared resource to each active application product from the identified set of individual resource allocations for each shared resource. The assigned individual resource allocation for each shared resource may be considered a selected/determined individual resource allocation for each individual application product. It should be noted that the assigned individual resource allocation for each shared resource for each active application product may also be added to the process ID list and may be used to generate a resource allocation rule for archival and reuse as described above and in more detail below, and the process ID list may be used in conjunction with the assigned individual resource allocations to identify the generated resource allocation rule for reuse.

At block 530, the process 500 generates a product-specific shared resource tuning configuration. At decision point 532, the process 500 makes a determination as to whether to form a new resource allocation rule based upon the generated product-specific shared resource tuning configuration. In response to determining to form a new resource allocation rule based upon the generated product-specific shared resource tuning configuration, the process 500 generates a new resource allocation rule that includes the assigned individual application product resource allocations within the single operating system instance at block 534. Generation of the new resource allocation rule may include identifying the generated resource allocation rule using the process ID list and including the generated product-specific shared resource tuning configuration to differentiate the generated resource allocation rule from other resource allocation rules having similar process ID lists. As also described above, a resource allocation rule may include one or more co-existence resource allocation rules. At block 536, the process 500 stores the generated resource allocation rule as a reusable resource allocation rule within either local storage or to a database. Storage of the generated resource allocation rule as a reusable resource allocation rule may include archiving the generated resource allocation rule with the process ID list as a resource allocation rule reuse identifier and the generated product-specific shared resource tuning configuration as a process ID list differentiator.

In response to completion of storing the generated resource allocation rule at block 536, or in response to determining at decision point 532 not to form a new resource allocation rule, or in response to determining at decision point 522 not to apply decision metrics to an obtained resource allocation rule, the process 500 transitions to the processing shown and described in association with FIG. 5B.

FIG. 5B illustrates additional processing associated with the process 500 for automated product-specific resource allocation within a single operating system instance. At block 538, the process 500 implements the individual resource allocations within the single operating system instance using local inter-product message communication bindings. It should be noted from the description above, that implementation of the individual resource allocations within the single operating system instance using local inter-product message communication bindings may include implementation of an obtained resource allocation rule, implementation of a generated resource allocation rule, and implementation of a generated product-specific shared resource tuning configuration within the single operating system instance for each of the application products that are active. It should also be understood that, where the process 500 is executed at a server device, such as the server 106, implementation of the product-specific shared resource tuning configuration may include instructing a client device, such as the computing device 102, to implement the respective product-specific shared resource tuning configuration and local inter-product messaging communication bindings via the single operating system instance.

At block 540, the process 500 determines resource usage efficiency related to at least one shared resource based upon the applied resource allocation rule and/or the generated product-specific shared resource tuning configuration. As described above, obtained resource allocation rules may include projected/expected efficiencies. As such, the determination of resource usage efficiency may be made relative to the projected/expected efficiencies associated with the obtained resource allocation rules. It should be noted that, where the process 500 is implemented at a server device, the determination at block 540 may be performed in response to receipt of messages that identify efficiency metrics and/or determinations received from a client computing device.

At decision point 542, the process 500 begins iterative processing to manage resource allocation changes, product changes, and completion of processing. At decision point 542, the process 500 makes a determination as to whether a resource allocation change has been detected relative to the applied individual resource allocations. As described above, a resource allocation change may result from an administrator modifying the automatically applied resource allocations or other change in resource allocation, as appropriate for a given implementation.

In response to determining at decision point 542 that a resource allocation change has not been detected, the process 500 makes a determination at decision point 544 as to whether a product change has been detected. As described above, a product change may be detected in association with installation, un-installation, activation, and de-activation of an application product, or other event as appropriate for a given implementation. In response to determining that a product change has not been detected at decision point 544, the process 500 makes a determination at decision point 546 as to whether processing is completed. In response to determining that processing has not been completed at decision point 546, the process 500 returns to decision point 542 and iterates as described above.

In response to determining at decision point 542 that a resource allocation change has been detected, the process 500 makes a determination at decision point 548 as to whether an improved resource usage efficiency has resulted from the detected resource allocation change. In response to determining that improved resource usage efficiency has not resulted from the detected resource allocation change, the process 500 returns to decision point 544 and iterates as described above. It should be noted that the process 500 may also generate an efficiency response report identifying any observed efficiency change.

In response to determining that improved resource usage efficiency has resulted from the detected resource allocation change, the process 500 forms a new resource allocation rule based upon the resource allocation change at block 550. As described above, generation of a resource allocation rule may include associating the process ID list and individual product-specific shared resource tuning information. Further, the determined efficiency information may also be associated with the resource allocation rule to improve reuse potential for the generated resource allocation rule.

At block 552, the process 500 sends the new resource allocation rule as resource allocation rule feedback to the database. At block 554, the process 500 stores the new resource allocation rule within local storage for reuse. The process ID list and individual product-specific shared resource tuning information may be used as resource allocation rule reuse identifiers, along with the determined efficiency information. The process 500 returns to decision point 544 and iterates as described above.

Returning to the description of decision point 544, in response to determining that a product change has been detected, the process 500 returns to the processing described in association with FIG. 5A at block 504 and iterates as described above. In response to determining that processing has been completed at decision point 546, the process 500 returns to the processing described in association with FIG. 5A at decision point 502 and iterates as described above.

As such, the process 500 performs automated product-specific resource allocation within a single operating system instance by determining active products within an operating system instance and creating a process ID list. The process ID list may be used to identify and obtain a reusable resource allocation rule based upon the active products within the single operating system instance. Decision metrics may be applied to obtained resource allocation rules and/or determined resource allocations and new resource allocation rules may be generated for reuse. Efficiency of implementations based upon resource allocation rules and/or determined individual product-specific shared resource tuning information may be monitored relative to projected/expected efficiencies associated with obtained resource allocation rules. Resource allocations may be also monitored to determine efficiency changes in response to resource allocation changes, and new resource allocation rules may be created for reuse in response to observations of improved operating and/or resource usage efficiency.

As described above in association with FIG. 1 through FIG. 5B, the example systems and processes provide automated product-specific resource allocation within a single operating system instance. Many other variations and additional activities associated with automated product-specific resource allocation within a single operating system instance are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
    at least one shared resource operable within a single operating system instance; and a processor programmed to:
        analyze, as a set, resource constraints of each of a plurality of individual application products to be configured for shared resource usage of the at least one shared resource within the single operating system instance, the processor being programmed to:
            apply at least one decision metric selected from a group of decision metrics consisting of what application products are installed within the single operating system instance, what application products are active within the single operating system instance, relative priorities of the plurality of individual application products, maximum resource usage values for each of the plurality of individual application products, minimum resource usage values for each of the plurality of individual application products, whether product process identifiers (IDs) may be split by specific user IDs, and whether any product shell scripts exist to allow pre-defined tuning;
        select an individual shared resource allocation for each of the plurality of individual application products based upon the applied at least one decision metric; and
        implement the determined individual shared resource allocation for each of the plurality of individual application products within the single operating system instance with communication efficiency implemented using local inter-product message communication bindings via the single operating system instance.

2. The system of claim 1, where:
    in being programmed to:
        analyze, as the set, the resource constraints of each of the plurality of individual application products to be configured for shared resource usage of the at least one shared resource within the single operating system instance, the processor is programmed to:
            determine active application products relative to installed application products within the single operating system instance; and
            determine at least one minimum resource utilization and one maximum resource utilization for each operating system shared resource utilized by at least one of the active application products; and the processor is further programmed to:
  identify a set of individual resource allocations for each shared resource utilized by the plurality of individual application products that utilizes each shared resource within resource limitations for the shared resource within the single operating system instance, and within the determined at least one minimum resource utilization and the determined at least one maximum resource utilization for each operating system shared resource utilized by the at least one of the active application products; and
  assign each individual resource allocation for each shared resource to each of the plurality of individual application products from the identified set of individual resource allocations for each shared resource as the determined individual shared resource allocation for each of the plurality of individual application products.

3. The system of claim 1, further comprising a memory, and where the processor is further programmed to:
  generate a resource allocation rule that comprises the selected individual shared resource allocation for each of the plurality of individual application products within the single operating system instance; and
  store the generated resource allocation rule as a reusable resource allocation rule in the memory.

4. The system of claim 1, where the processor is further programmed to:
  generate a process identification (ID) list comprising a product-specific process ID of each of the plurality of individual application products;
  identify, using the process ID list, a resource allocation rule that comprises the individual shared resource allocation for each of the plurality of individual application products within the single operating system instance via a database of reusable resource allocation rules; and
  obtain the resource allocation rule from the database using the process ID list as a resource allocation rule reuse identifier.

5. The system of claim 4, where the resource allocation rule comprises at least one co-existence resource allocation rule that operates to identify configurations comprising at least two application products that similarly utilize the at least one shared resource.

6. The system of claim 4, where the processor is further programmed to:
  determine a resource usage efficiency related to at least one shared resource based upon the resource allocation rule;
  detect a resource allocation change relative to the resource allocation rule;
  determine whether an improved resource usage efficiency results from the detected resource allocation change;
  form a new resource allocation rule in response to determining that the detected resource allocation change results in the improved resource usage efficiency; and
  send resource allocation rule feedback to the database comprising the new resource allocation rule.

7. The system of claim 1, where the processor is further programmed to:
  detect an application product change comprising one of an installation of a new application product, an un-installation of an active application product, an activation of an application product, and a deactivation of an application product within the single operating system instance, resulting in a new plurality of individual application products;
  analyze, as a new set, resource constraints of each of the new plurality of individual application products to be configured for shared resource usage within the single operating system instance;
  determine an individual shared resource allocation for each of the new plurality of individual application products based upon the analyzed new set of resource constraints of each of the new plurality of individual application products; and
  implement the determined individual shared resource allocation for each of the new plurality of individual application products within the single operating system instance using the local inter-product message communication bindings via the single operating system instance.

8. A computer program product comprising a non-transitory computer readable storage medium including computer readable program code, where the computer readable program code when executed on a computer causes the computer to:
  analyze, as a set via a resource allocation module, resource constraints of each of a plurality of individual application products to be configured for shared resource usage of at least one shared resource within a single operating system instance, the computer readable program code when executed on the computer causing the computer to:
    apply at least one decision metric selected from a group of decision metrics consisting of what application products are installed within the single operating system instance, what application products are active within the single operating system instance, relative priorities of the plurality of individual application products, maximum resource usage values for each of the plurality of individual application products, minimum resource usage values for each of the plurality of individual application products, whether product process identifiers (IDs) may be split by specific user IDs, and whether any product shell scripts exist to allow pre-defined tuning;
  select an individual shared resource allocation for each of the plurality of individual application products based upon the applied at least one decision metric; and
  implement the determined individual shared resource allocation for each of the plurality of individual application products within the single operating system instance with communication efficiency implemented using local inter-product message communication bindings via the single operating system instance.

9. The computer program product of claim 8, where:
in causing the computer to:
  analyze, as the set via the resource allocation module, the resource constraints of each of the plurality of individual application products to be configured for shared resource usage of the at least one shared resource within the single operating system instance, the computer readable program code when executed on the computer causes the computer to:
    determine active application products relative to installed application products within the single operating system instance; and
    determine at least one minimum resource utilization and one maximum resource utilization for each operating system shared resource utilized by at least one of the active application products; and
  the computer readable program code when executed on the computer further causes the computer to:

identify a set of individual resource allocations for each shared resource utilized by the plurality of individual application products that utilizes each shared resource within resource limitations for the shared resource within the single operating system instance, and within the determined at least one minimum resource utilization and the determined at least one maximum resource utilization for each operating system shared resource utilized by the at least one of the active application products; and assign each individual resource allocation for each shared resource to each of the plurality of individual application products from the identified set of individual resource allocations for each shared resource as the determined individual shared resource allocation for each of the plurality of individual application products.

10. The computer program product of claim 8, where the computer readable program code when executed on the computer further causes the computer to:

generate a resource allocation rule that comprises the selected individual shared resource allocation for each of the plurality of individual application products within the single operating system instance; and store the generated resource allocation rule as a reusable resource allocation rule.

11. The computer program product of claim 8, where the computer readable program code when executed on the computer further causes the computer to:

generate a process identification (ID) list comprising a product-specific process ID of each of the plurality of individual application products;

identify, using the process ID list, a resource allocation rule that comprises the individual shared resource allocation for each of the plurality of individual application products within the single operating system instance via a database of reusable resource allocation rules; and obtain the resource allocation rule from the database using the process ID list as a resource allocation rule reuse identifier.

12. The computer program product of claim 11, where the resource allocation rule comprises at least one co-existence resource allocation rule that operates to identify configurations comprising at least two application products that similarly utilize the at least one shared resource.

13. The computer program product of claim 11, where the computer readable program code when executed on the computer further causes the computer to:

determine a resource usage efficiency related to at least one shared resource based upon the resource allocation rule;

detect a resource allocation change relative to the resource allocation rule;

determine whether an improved resource usage efficiency results from the detected resource allocation change;

form a new resource allocation rule in response to determining that the detected resource allocation change results in the improved resource usage efficiency; and send resource allocation rule feedback to the database comprising the new resource allocation rule.

14. The computer program product of claim 8, where the computer readable program code when executed on the computer further causes the computer to:

detect an application product change comprising one of an installation of a new application product, an un-installation of an active application product, an activation of an application product, and a deactivation of an application product within the single operating system instance, resulting in a new plurality of individual application products;

analyze, as a new set via the resource allocation module, resource constraints of each of the new plurality of individual application products to be configured for shared resource usage within the single operating system instance;

determine an individual shared resource allocation for each of the new plurality of individual application products based upon the analyzed new set of resource constraints of each of the new plurality of individual application products; and implement the determined individual shared resource allocation for each of the new plurality of individual application products within the single operating system instance using the local inter-product message communication bindings via the single operating system instance.

* * * * *